(12) United States Patent
Jung

(10) Patent No.: US 6,387,006 B1
(45) Date of Patent: May 14, 2002

(54) GEARBOX

(75) Inventor: Thomas Jung, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/508,888

(22) PCT Filed: Aug. 21, 1998

(86) PCT No.: PCT/EP98/05327

§ 371 Date: Jun. 16, 2000

§ 102(e) Date: Jun. 16, 2000

(87) PCT Pub. No.: WO99/15810

PCT Pub. Date: Apr. 1, 1999

(30) Foreign Application Priority Data

Sep. 19, 1997 (DE) .......................................... 197 41 440

(51) Int. Cl.[7] .............................................. F16H 3/00
(52) U.S. Cl. ...................................................... 475/207
(58) Field of Search ................................ 475/207, 208, 475/218

(56) References Cited

U.S. PATENT DOCUMENTS

| | | | | |
|---|---|---|---|---|
| 1,631,939 A | * | 6/1927 | Simpson ...................... | 475/207 |
| 1,870,076 A | | 8/1932 | Thomson | |
| 2,138,028 A | * | 11/1938 | Dooley ........................ | 475/207 |
| 2,155,476 A | * | 4/1939 | Dooley ........................ | 475/207 |
| 2,330,821 A | | 10/1943 | Finzi | |
| 2,839,951 A | * | 6/1958 | Winther ....................... | 475/207 |
| 3,357,276 A | | 12/1967 | Vavulo et al. ............... | 475/209 |
| 3,533,307 A | * | 10/1970 | Gunderson ................... | 475/207 |
| 4,183,264 A | | 1/1980 | Reed | |
| 4,641,549 A | | 2/1987 | Muller ......................... | 74/732 |
| 4,788,887 A | | 12/1988 | Lepelletier .................. | 475/218 |
| 4,924,729 A | | 5/1990 | Sherman et al. ............ | 475/207 |
| 5,259,260 A | | 11/1993 | Schneider .................... | 74/331 |
| 5,564,997 A | * | 10/1996 | Janson et al. ................ | 475/207 |

FOREIGN PATENT DOCUMENTS

| | | |
|---|---|---|
| DE | 20 29 726 | 1/1971 |
| DE | 25 18 528 | 11/1976 |
| DE | 27 34 740 | 2/1979 |
| DE | 31 29 681 | 2/1983 |
| DE | 33 08 525 | 9/1984 |
| DE | 41 07 739 | 9/1991 |
| EP | 0 476 794 | 3/1992 |
| EP | 0 513 674 | 11/1992 |
| GB | 1 596 830 | 9/1981 |
| GB | 2 195 721 | 4/1988 |
| JP | 3-51574 | 3/1991 |
| WO | WO 95/24574 | 9/1995 |

\* cited by examiner

Primary Examiner—Sherry Estremsky
(74) Attorney, Agent, or Firm—Crowell & Moring LLP

(57) ABSTRACT

A gearbox, in particular for motor vehicles, has an input shaft and an output shaft, as well as a first torque-transmitting device which is arranged between input and output shafts, makes possible various transmission ratios and, in one mode of operation, totally interrupts force transmission from the input shaft to the output shaft. The object of the invention is to provide a cost-effective gearbox with an automatic mode which can transmit high torques and avoid a total load interruption during gear shifts or changes in transmission ratio. This object is attained in the above-mentioned gearbox in that a second torque-transmitting device is arranged parallel to the first device between input and output shafts and transmits, unlike the first device, a selectable torque which is continuously variable from near zero to its maximum possible value.

19 Claims, 12 Drawing Sheets

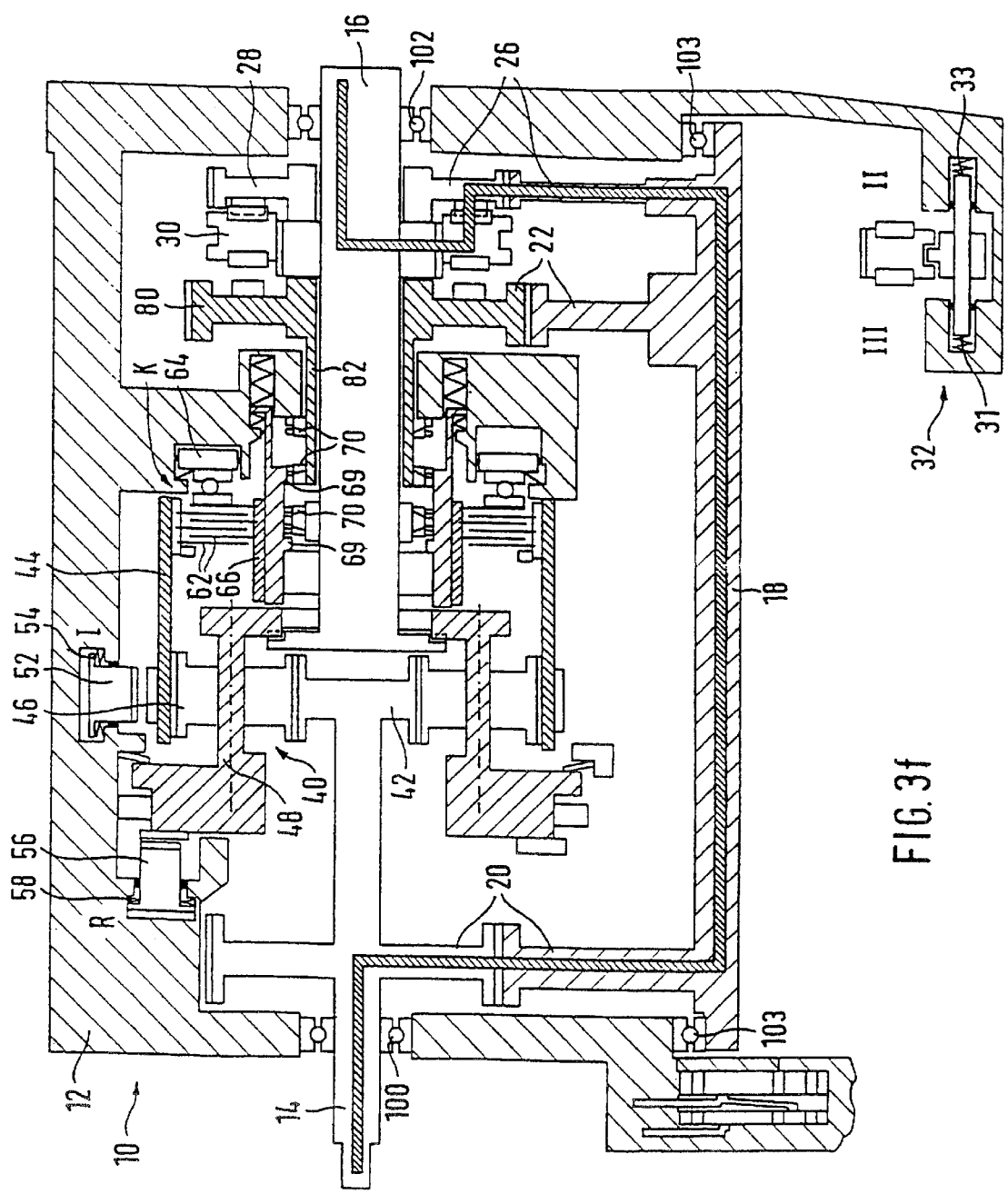

GEARBOX

BACKGROUND AND SUMMARY OF THE INVENTION

The invention relates to a variable speed transmission especially a variable speed transmission for motor vehicles.

Various types of variable speed or variable ratio transmissions are known. Transmissions of this kind are used for example in a motor vehicle for changing the rotational speed of an engine with a certain transmission ratio or torque conversion. In addition, a transmission of this kind can ensure the idling of an engine when a vehicle is at rest. Finally, it is possible to reverse the direction of rotation of the drive shaft by means of a transmission.

A simple variable speed transmission can be created by a manual gearbox with an input (drive) shaft, an output shaft, and a countershaft. The drive shaft is connected with the engine by a clutch so that it can be decoupled forcewise from the engine when shifting. A drive gear sits on the drive shaft that drives the countershaft which in turn is nonrotatably connected with other gears. Gears mounted on the countershaft can be meshed with the gears of the drive shaft. Depending on the choice of a speed and hence of one such gear pair, a desired transmission ratio can be created.

The manual gearbox mentioned above has high efficiency, low weight, and is relatively inexpensive because of its simple design. However, no automatic mode can be achieved with a manual gearbox of this kind. In addition, the load between the engine and the input wheels is interrupted with every shift so that the force of the engine cannot be utilized constantly during a continuous acceleration process. In general, the manual gearbox has a relatively low level of comfort. In addition, a separate starting clutch must be provided to decouple the transmission with the input engine.

An automatic transmission is known as a conventional transmission with an automatic mode as the name itself suggests. A conventional automatic transmission usually has a flow converter on the input shaft side that serves as a starting clutch and produces increases in torque in the conversion range. Usually combinations of several planetary transmissions are connected downstream of the converter, said transmissions depending on the positions of individual gears or groups of gears, and perform a torque and rpm conversion as well as a possible reversal of the direction of rotation for a reverse gear. The shifting processes are usually performed by an electrohydraulic control that produces automatic upshifts and downshifts of the individual gears at the correct point in time.

The automatic transmission suffers from relatively high losses and requires a complex design. A transmission of this kind is generally cost-intensive, has a high weight, and requires complex control.

The same disadvantages affect an automatic transmission with an integrated starting clutch. In a transmission of this kind, only the losses can be reduced slightly.

Another alternative for a variable speed transmission is offered by a manual gearbox with automated shifting. In such a transmission, which resembles the manual transmission described above, all of the clutching and shifting processes are performed fully automatically in accordance with the driver's wishes. In this way, an automatic mode can in fact be achieved but even with this transmission subject to load interruption when shifting cannot be reduced. Otherwise, in the course of an automated shift, a high control effort, especially in engine control, is required. It also requires a starting clutch with similarly automated control.

Another possibility for a variable speed transmission is provided by a stepless automatic transmission with transfer belts or steel thrust belts, or in a transmission of this kind, a planetary transmission with a forward gear and a reverse gear as well as a multiplate clutch and a continuously adjustable primary v-pulley are provided in such a transmission on the drive shaft. The force transfer to a secondary v-pulley on the drive shaft is accomplished for example through a steel thrust belt. By axial displacement of one diagonally opposite disk half of the v-pulley, the effective lever arms become larger or smaller and the transmission ratio can be chosen, depending on the choice of the ratio of the lever arms r1 to r2.

With such a transmission, however, only lower power levels can be transmitted. Such a transmission is not suitable for transmitting high torques.

Finally, a double clutch transmission is known in which two clutches act on a two-part drive shaft with fixed gears. One half shaft is hollow and surrounds approximately half the second half shaft. Loose gears fit on the drive shaft and are connected with the latter by mechanical selector sleeves. In order to shift gears, one clutch must be released and the other engaged at the same time while the mechanical shifting process is completed within the final closing phase of both clutches. The double clutch also acts as a starting clutch.

The disadvantage of such a double clutch transmission is the use of two clutches which must be so designed that they can transmit even the maximum torque that develops.

The goal of the invention is to provide an economical variable-speed gearbox with an automatic mode, which can transmit high torques and avoids complete load interruption when shifting or changing gear.

This goal is achieved by the variable transmission especially for motor vehicles with an input shaft and a output shaft, as well as a first device located between the input shaft and the output shaft, delivering torque and permitting variable rpm transmission ratios, said device in one operating mode ensuring a complete power flow decoupling of the input shaft and the output shaft, and with a second device provided in parallel with the first device for force transmission between the input shaft and output shaft, with which in contrast to the first device, a continuously selectable torque in the range from zero to the maximum applied torque can be transmitted characterized in that the second device comprises a planetary transmission.

Accordingly, in parallel (especially with regard to a power flow) to a first device, therefore essentially to a first transmission, between the input shaft and the output shaft, a second torque-transmitting device is interposed as well with which a continuously selectable torque in the range from zero to the maximum applied torque can be transmitted between these two shafts. The value of the torque can be controlled or regulated.

Since it is possible to have an interruption in the power flow between the input and output shafts in both the first and second devices, it is not necessary to provide a separate clutch any longer between an input motor and the transmission itself. The clutch is already integrated into the gearbox with a corresponding design, and it is not necessary to perform any maintenance. This "integrated clutch" is economical, requires less space for the transmission-engine unit, and reduces the cost of construction as well as maintenance and repair expenses.

An important point regarding the invention consists in the fact that by a suitable control of the second device, such a torque transmission from the input to the output shaft or vice versa can be performed, that no further torque is transmitted through the first unit, and the transmission ratio in this first unit can be easily changed; for example a shiftable spur gear to be brought into or out of engagement with a shaft or another gear can be shifted in a force-free manner. Since a positive connection or torque connection through the second torque-transmitting device can be maintained between the input and output shafts even when shifting the first device, a complete interruption of the load, for example between a drive motor and drive wheels, is effectively prevented. With suitable control of the second device, a load decrease can be kept very small. The driver then gains the impression, even while shifting, that the vehicle is being continuously accelerated or decelerated. A "jerk effect" caused by different accelerations can be avoided.

In the variable speed transmission according to the invention, the function of a "hill holder" can be provided in simple fashion. A hill holder offers the opportunity to remain at rest on a slope or hill without operating the brakes and to initiate a starting process without the risk of rolling backward by a simple accelerator actuation. Finally, the control cost, especially the control cost for digital engine electronics, can be kept low.

In addition, upshifts can be performed without or with only a low lock time and downshifts can be performed during the performance of an upshift or downshift. Therefore, in downshifts it is not necessary to wait until a previously selected shift has been performed. A shift request can be reported through shift curves, authorized shift signals, or a sequential demand unit.

Finally, the present variable speed transmission according to the invention is also suitable for installation in sport vehicles with especially high engine power.

Additional embodiments as well as advantages and features are provided in the subclaims.

An especially simple possibility for performing continuous torque transmission from the input shaft to the output shaft and vice versa is provided by the use of an efficiency unit based on friction, for example a clutch or brake unit. A clutch must be able to operate in a slip mode and be controlled so that depending on the selected clutch pressure and the resultant slip effect, a desired torque can be transmitted and be applied exactly.

One especially preferred embodiment is characterized by the fact that the first device is in the form of a simple variable speed transmission. In this case, it is possible to take advantage of the special advantages of a variable speed transmission, namely its simple design, high efficiency, compact nature, and high force transmission ability.

Especially preferred is an embodiment in which the second device comprises another transmission. A transmission is provided as an especially suitable additional transmission in the torque-transmitting device, preferably a planetary transmission. In a planetary transmission, various transmission ratios can be achieved in simple fashion in a compact manner. In addition, it is possible to reverse the direction of rotation easily for a reverse gear.

Preferably, the clutch engages the ring gear of the planetary transmission.

According to a preferred embodiment, the ring gear must be secured by a locking device or clutch relative to a transmission housing. As a result, a first transmission possibility is provided, for example a first gear. This transmission step then no longer requires implementation by the first device, for example the variable speed transmission.

It is also possible to decouple the planet carriers which in normal operation can be coupled with the output shaft, from the latter, for example by axial displacement thereof. With a simultaneous locking of the planetary transmission, a reverse gear can be engaged. For example, the ring gear is coupled by the clutch with the output shaft. Of course, other design solutions are also possible for a reverse gear function.

According to a preferred embodiment, the sun gear is or can be coupled with the drive shaft and the planet gear carrier. The precisely reversed design solution is also possible depending on the application.

According to another preferred embodiment, the second device, especially the clutch, is affected by a control designed so that the control, especially the pressure regulation for the clutch, can be controlled as a function of the engine rpm and/or the input rpm and/or the gear that has been engaged or called for and/or the input rpm gradient and/or output rpm gradient. If a clutch is used, it can be controlled continuously from the completely decoupled state to the completely engaged state, with clutch slip taking place in such an intermediate state.

The clutch can be designed as a plate clutch. On the one hand it is connected indirectly or directly with the drive or output shaft or the shiftable spur gears mounted on it or the drive housing and on the other hand with a planetary transmission element (sun gear, planet gear carrier, ring gear), with this shaft associated with this planetary transmission element has no direct connection to the drive or output shaft which in turn is connected indirectly or directly with the clutch.

According to an especially preferred embodiment, between the clutch on the one hand and the input or output shaft coupled directly or indirectly thereby or the shiftable spur gears located thereon on the other hand, a shifting device is provided which permits a controllable coupling between the planetary transmission on the one hand and optionally the input or output shaft, the shiftable spur gears mounted thereon, or the transmission housing on the other.

The shifting device for example can be designed as an axially displaceable bushing, coupling hub, or the like which has elements that are releasably nonrotatably connectable with the transmission housing, a part of a shiftable spur gear, or the output or input shaft.

In addition, synchronizing devices can be provided between this shifting device, especially the displaceable sleeve, coupling hub or the like, and the input or output shafts, spur gears, and the like that can be connected with it.

A connection between the shifting device and a shiftable spur gear located on the input or output shafts is possible to implement in an especially simple manner when the spur gear has a hollow shaft that extends through the input or output shaft.

A direct coupling device between the input and output shafts is also advantageous since as a result direct drive can be engaged [with which the respective transmission loss can be avoided.

In particular, the clutch of the torque-transmitting device and/or the switching device can be operated electromechanically and/or hydraulically and/or pneumatically.

Further advantages and features as well as advantageous embodiments will be found in the subclaims.

The invention will now be explained in greater detail with respect to other advantages and features as seen in embodiments and with reference to the enclosed drawings.

BRIEF DESCRIPTION OF THE DRAWINGS

FIGS. 3a to 3h each show similar sections through a variable speed transmission as in FIG. 2, whereby the flow of force is indicated by a solid line depending on the shift or the engaged transmission ratio;

DETAILED DESCRIPTION OF THE DRAWINGS

Figure 1:
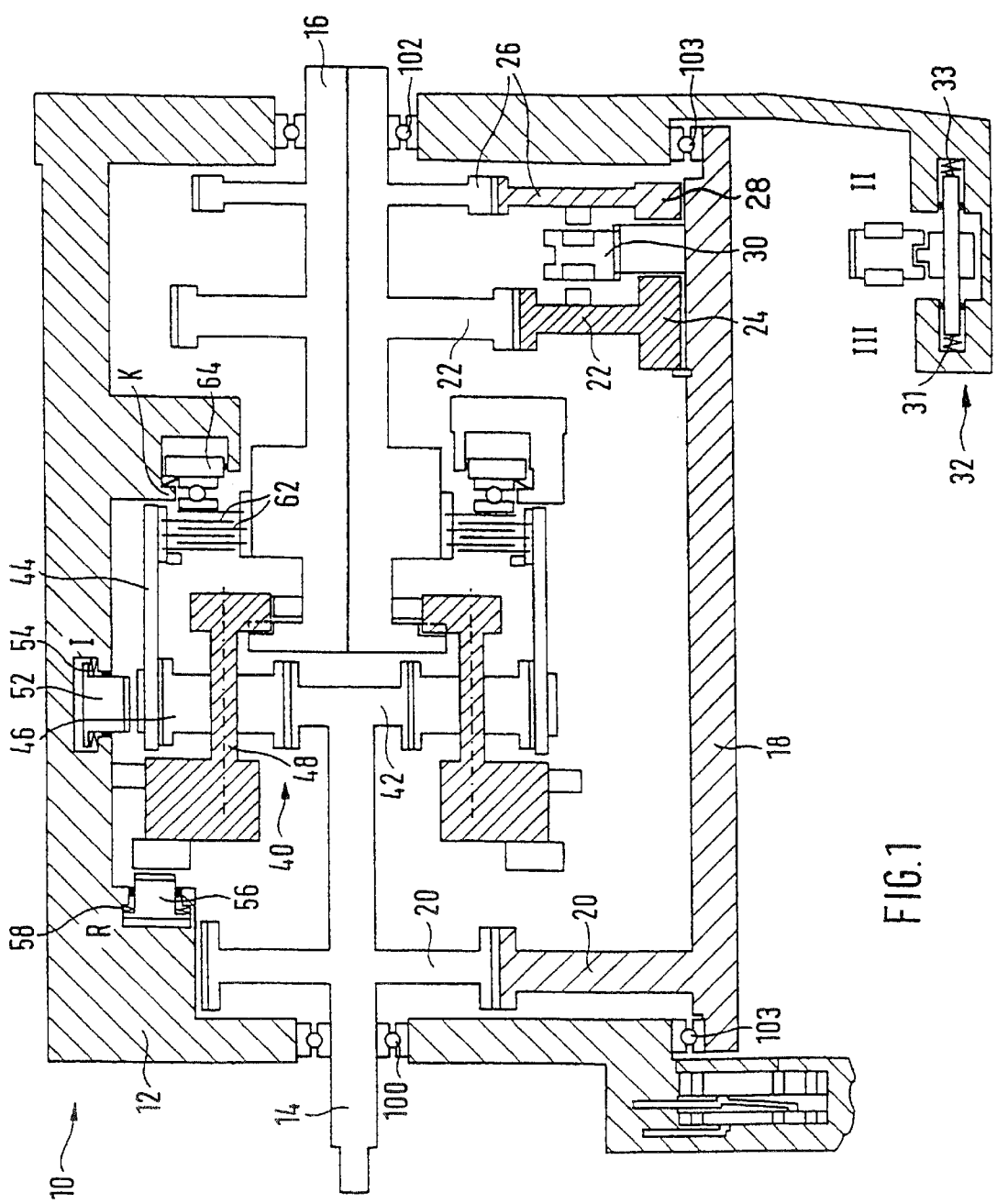
FIG. 1 shows a highly schematic section of a simple embodiment of a variable speed transmission according to the invention.

A simple embodiment of a variable gear transmission according to the invention is shown in FIG. 1.

In a transmission housing 12, aligned coaxially, are a drive shaft 14 coming from a drive motor (not shown) and an output drive shaft 16 leading to the output wheels. Drive shaft 14 and output shaft 16 are mounted rotatably by bearings 100 and 102 in transmission housing 12.

Parallel to input and output shafts 14 and 16 respectively, a countershaft 18 is also provided which, together with the spur gears mounted on it, is shown only in a half section. The countershaft 18 is secured rotatably in transmission housing 12 by two end bearings 103.

A force transmission between drive shaft 14 and countershaft 18 takes place via a pair of input gears 20 whose individual spur gears are each attached permanently to the associated shaft, in other words drive shaft 14 and countershaft 18.

A transmission of force between countershaft 18 and output shaft 16 takes place in the present example via two spur gear pairs 22 and 26 of which one spur gear, in the present case the spur gears 24 and 28 mounted on the countershaft can be shifted, in other words they can be connected to and disconnected from the respective shaft.

A shifting device 32 is provided for coupling and connecting the shiftable spur gears 24 and 28 with countershaft 18, said device 32 being able through shift cylinder 31 and 33 to displace a selector sleeve 30 in the axial direction of countershaft 18 so that optionally spur gear 24, spur gear 26, or neither of these gears can be connected with countershaft 18.

According to the schematic representation in FIG. 1, when a spur gear 24 or 28 engages selector sleeve 30 the pin of one spur gear engages recesses in selector sleeve 30. The actual practical implementation will however not be discussed in greater detail since this is not the subject of the present invention. It is only important in this case that a given spur gear is shifted with a shaft in suitable fashion.

The axial displacement of selector sleeve 30 mentioned above is achieved by hydraulic actuation of shifting cylinder 31 and 33 with no significant torque or force moment taking place during a shift between countershaft 18 and the spur gears 24, 28 connected therewith or to be connected therewith.

The gears of gear pairs 22 and 26 complementary to shiftable gears 24 and 28 are permanently mounted on output shaft 16.

A torque-transmitting device is provided in a central position in FIG. 1, said device, as will be explained below, being able to transfer a desired continuously selectable torque from the input shaft 14 to the output shaft 16 or vice versa.

The torque-transmitting device in the present embodiment comprises a planetary transmission 40 and a clutch K.

Other torque-transmitting devices are also possible. However, a device must be provided which can interrupt the power flow between the drive shaft and the output shaft and can perform controlled torque transfer.

A sun wheel 42 of planetary transmission 40 is provided at the end of drive shaft 14. This sun wheel 42 meshes with planet wheels 46 of the planetary transmission. The planetary wheels 46 are held in a planet carrier 48 slightly displaceable in its axial direction. In the normal state, planet carrier 48 is coupled with drive shaft 16 so that when planet carrier 48 rotates, drive shaft 16 moves with it and vice versa. The planet gears roll on a ring gear 44 of planetary transmission 40.

Ring gear 44 is extended beyond the plane of planetary transmission 40 in the direction of the drive shaft. At this end some of the plates 62 of a plate clutch K are disposed radially inward. The complementary plates 62 in the present embodiment are located directly on drive shaft 16.

A connection is created between ring gear 44 and drive shaft 16 by coupling plates 62. The coupling and hence the operation of the clutch are produced by a clutch cylinder 64. It is important in this regard that the clutch cylinder 64 can be controlled precisely so that the clutch can be kept in an appropriate slipping or dragging operation depending on the torque transfer requirement. As a result, a precisely metered torque transfer is initially possible between ring gear 44 and drive shaft 16.

The clutch cylinder is controlled hydraulically in the present example. However, other types of control are also possible.

Alternatively, a clutch different from the present plate clutch K can be used between ring gear 44 and drive shaft 16. In choosing the clutch, however, it is important to determine the ability to transfer the torque in a precisely metered fashion and also to ensure high torque transfer.

The pressure regulation for the clutch or other impact in other clutches takes place through a control, not shown, which produces a required clutch actuation depending on engine operating conditions, from the engine rpm, drive rpm, the speed engaged or required, or the input or output rpm gradients.

A locking device 52 is provided in transmission housing 12 radially outside planetary transmission 40; device 52 by actuating a first shift cylinder 54 can be moved radially inward, in other words against ring gear 44 of the planetary transmission 40 in order to secure the latter against transmission housing 12.

In addition, a second locking device 56 is located in the transmission housing 12, essentially in the present example in the axial direction of the planetary transmission 40; device 56, by actuating a second shift cylinder 58, displaces the planet carrier in its axial direction and locks it to the transmission housing 12.

In the following, in the variable transmission according to FIG. 1, the frictional connection and torque conversion will now be described.

With a vehicle at rest and the engine in neutral, the drive shaft 44 drives countershaft 18 through the pair of spur gears 20. However, both spur gears 24 and 28 are decoupled from countershaft 18 so that no force is transmitted to the drive shaft 16 through spur gear pair 22 and 26. The clutch K is also disengaged so that there is no frictional connection between planetary transmission 40 and drive shaft 16. Planetary transmission 40 runs freely.

With first gear engaged, ring gear 44 of planetary transmission 40 is secured against transmission housing 12 by operating the first shift cylinder 54 and hence operating locking device 52. As a result, the drive shaft drives planet gears 46 through the sun wheel 42. Through the planet carriers 48 that move in the same direction as the sun wheel and are coupled with drive shaft 16, first (gear) is engaged. To characterize this first gear, in FIG. 1 the number 1 is shown on the locking device 52. It is meant to indicate that first gear can be reached by operating locking device 52.

In second and third gears or the corresponding gear ratios depending on the gear selected, spur gear pair 22 or 26 is connected to deliver torque, i.e. the correspondingly arranged shiftable gear 24 or 28 is then connected with countershaft 18 by selector sleeve 30. With a gear completely engaged, in other words not during a shifting process, clutch K is disengaged and does not transmit any torque.

Finally, the fourth gear is produced by a direct coupling of the drive shaft 14 and the drive shaft 16. In the present example, this is achieved by clutch K being operated without slip (complete coupling). Since the planet gear carrier is in mesh with the drive shaft and the ring gear 44 and drive shaft 16 are completely coupled, planet gear carrier 48 is fixed relative to hollow shaft 44. Planet gears 46 cannot roll on ring gear 44. The entire planet gear set then turns at the rotational speed of the engine (direct transmission).

During the respective shifting processes between the individual transmission ratios mentioned above, the clutch is usually operated in slip in such fashion that a controlled precisely metered torque transfer is performed between ring gear 44 and drive shaft 16. Depending on the locking or shifting of planetary transmission gears 42, 44, 46, torques between countershaft 18 and the shiftable spur gears 24 and 28 (or to be shifted) becomes zero so that they can be coupled or decoupled to or from countershaft 18.

Reverse gear is produced in the variable transmission according to FIG. 1 by the planet gear carriers being decoupled from drive shaft 16 and locked relative to transmission housing 12 (activation of locking device 55 by shift cylinder 58), while ring gear 44 on the other hand is coupled by clutch K. This causes ring gear 44 to turn in the opposite direction and hence drive shaft 16 as well, with respect to drive shaft 14 at a certain transmission ratio.

In the starting process, the rpm of the drive shaft is initially 0, exactly the same as the rpm of the planet gear carrier 48 connected with drive shaft 16. Drive shaft 14 turns in accordance with the engine rpm. Ring gear 44 rotates in the opposite direction. When controlled and increasing clutch actuation is performed, the ring gear 44 that initially turns in the opposite direction from the drive shaft is braked. As a result, a torque is transferred from the planet gear carrier 48 to drive shaft 16 and drive shaft 16 rotates increasingly faster. Clutch K is engaged until ring gear 44 is stopped relative to housing 12. In this condition, the first shift cylinder 54 is actuated whereupon the ring gear 44 is locked to transmission housing 12. Clutch K can then be released again. Planet carrier 48 and drive shaft 16 connected thereto then turn with a first transmission ratio corresponding to first gear.

In this way, a starting clutch is also produced so that no separate clutch between the drive motor and the transmission is required.

In another shift from first to second gear, initially the lock between ring gear 44 and housing 12 is released by locking device 52 so that clutch K can be operated in such fashion that no torque any longer applies between ring gear 44 and locking device 52.

Then clutch K is operated further to produce torque transfer in such fashion that the rpm of output shaft 16 and countershaft 18 are matched for a torque-free and force-free connection of spur gear 24 with countershaft 18 by selector sleeve 30. The coupling between countershaft 18 and spur gear 24 takes place by an appropriate actuation of shift cylinder 33 and hence an axial displacement of selector sleeve 30.

Numbers II and III refer to the shift cylinders 31 or 33 to be actuated. Selector sleeve 30 moves in the opposite direction after the shift cylinder has been actuated.

The control can react to vehicle states, especially engine rpm, drive rpm, gear engaged or requested, and the input or output rpm gradients. The control requirements can be stored in a characteristic curve or in corresponding tables. Alternatively, they can also be calculated continuously on a real-time basis.

If gear 24 is shifted so that the force flow can be conducted through gear pair 22 from the input shaft 14 to the output shaft 16, clutch K is released again.

In a following shifting process into third gear, clutch K initially is operated again in such fashion that, as a result of a corresponding force transfer from the input shaft 14 to the output shaft 16 through the planetary transmission and coupling, gear 24 is shifted in a torque-free and force-free manner relative to countershaft 18. In this state, gear 24 is decoupled. Then clutch K is operated further until a corresponding rpm equalization between countershaft 18 and the output shaft 16 has taken place in such fashion that gear 28 can be coupled in a torque-free manner with countershaft 18. If coupling takes place by actuating shift cylinder 33 and hence a torque connection by the input shaft 14 through countershaft 18 to output shaft 16 is produced, clutch K is released once again.

The shifting process into fourth gear is structured in a corresponding fashion, in which the clutch K is again operated in such fashion that gear 28 is shifted in a force-free manner relative to countershaft 18. After decoupling gear 28 from countershaft 18, the clutch is actuated further in such fashion that ring gear 44 is secured relative to output shaft 16. As a result of the continuing engagement of planet gear carrier 48 with output shaft 16, the sun gear, ring gear, and planet gear are all blocked so that a direct shift between input shaft 14 and output shaft 16 is achieved. The output shaft 16 in this case operates at the same rpm as input shaft 14.

The downshifts between speeds 4, 3, 2, and 1 as well as neutral are created in exactly the opposite sequence.

When reverse is engaged, planet gear carrier 48 which is otherwise coupled with output shaft 16 is decoupled from the latter and secured relative to the transmission housing. Then clutch K is operated so that the ring gear turning in the opposite direction from the input shaft 14 drives output shaft 16, likewise in the opposite direction.

In the variable transmission according to FIG. 1, it is important that as a result of the coupling of ring gear 44 with output shaft 16 through clutch K, a shift of ring gear 44 and planet gear carrier 48 can take place so that an rpm and torque match between input shaft 14 and output shaft 16 as well as countershaft 18 and gears 24 and 28 that are shiftable and are mounted thereon can take place.

All in all, with this simple variable transmission, an unsynchronized multispeed transmission with a countershaft can be produced in which the highest gear is designed as direct drive. Between the input and the output shafts, a coupling or planetary transmission is integrated which produces a complete load interruption by matching rpm values through a clutch when starting and shifting, avoiding complete load interruption.

Figure 2:
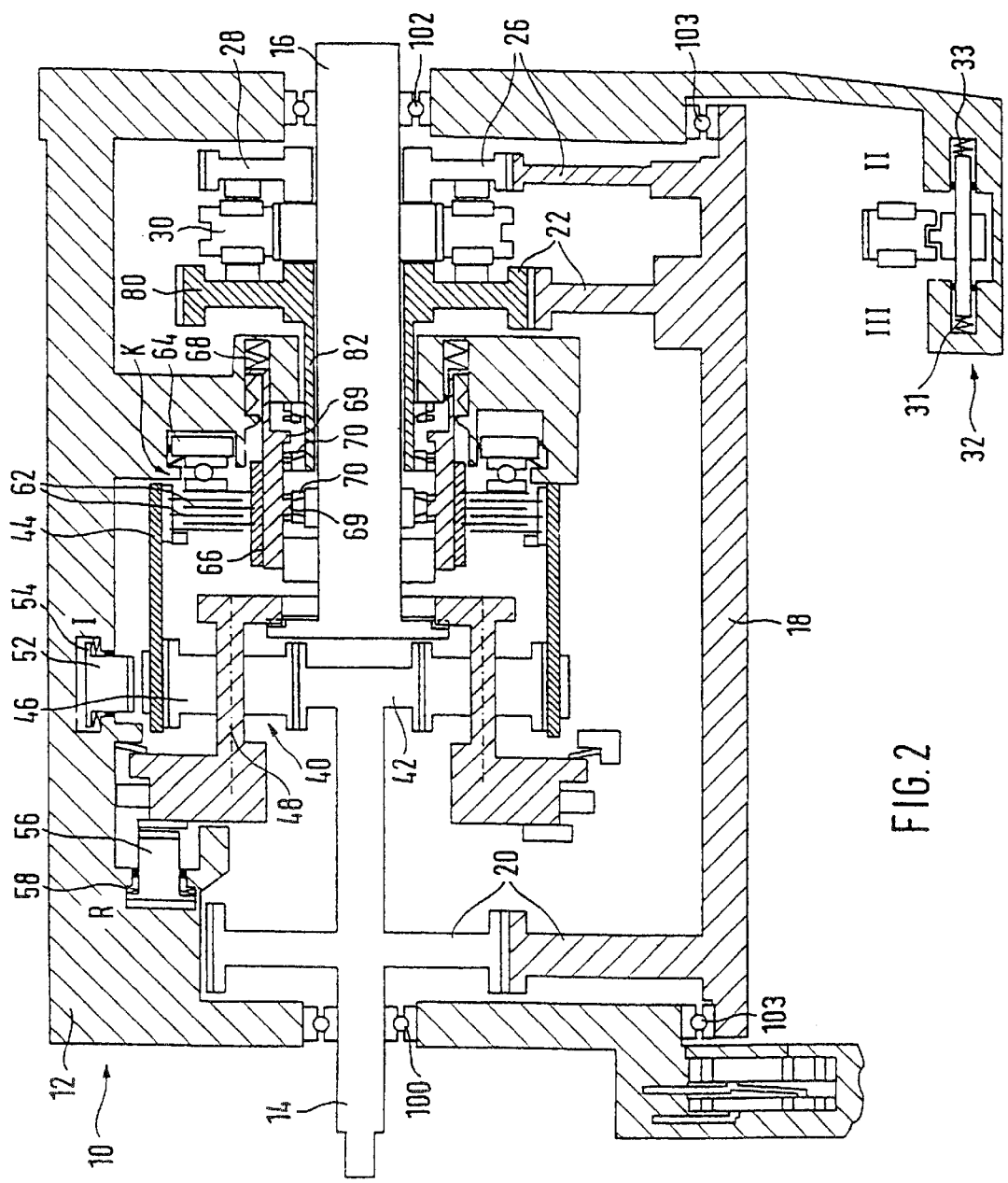
FIG. 2 is a highly schematic section through a second embodiment of a variable speed transmission according to the invention.

In FIG. 2, another embodiment of a variable transmission is shown which has been slightly modified with respect to the embodiment shown in FIG. 1. These differences will be discussed below. The same reference numbers refer to the same or corresponding parts or features.

The important difference between the variable transmission in FIG. 2 and that in FIG. 1 is that a shifting device is provided between clutch K and the output shaft.

The switching device is essentially a clutch hub 66 that is mounted on output shaft 16 and is displaceable in the axial direction of the latter, on which hub, in contrast to the arrangement in FIG. 1, a portion of the plates 62 of clutch K are provided radially externally, and can be connected through the clutch with the ring gear 44 of planetary transmission 40.

The clutch hub 66 made essentially cylindrical is received at one end in a hub cylinder 68. By operating hub cylinder 68, clutch hub 66 can be displaced in the axial direction of the drive shaft. On its radially inner side, clutch hub 66 has various hub noses 69 which, as will be explained below, can be brought into engagement with drive housing 12, a shiftable spur gear 80, or drive shaft 16. Hub noses 69 are shown only schematically in FIG. 2 and FIGS. 3a to 3h, exactly like the engaging devices, designed in a corresponding complementary fashion on drive shaft 16, spur gear 80, or housing 12.

Similarly shown schematically between hub clutch 66 and the corresponding parts are synchronizing rings 70, which will not be discussed separately, because their design is generally known.

Another modification of the variable transmission relative to the embodiment in FIG. 1 is characterized by the fact that the shiftable gears of are provided on gear pairs 22 and 26 on drive shaft 16, namely in the form of gears 28 and 80.

Gear 80 has a hollow shaft 82 through which drive shaft 16 passes. Hollow shaft 82 extends in the direction of clutch hub 66 so that with a corresponding axial displacement of clutch hub 66, a nonrotating connection can be produced between this nose and gear 80.

Corresponding to the displacement of clutch hub 66, clutch K can be optionally connected with transmission housing 12, gear 80, or output shaft 16.

The reader is referred to the description of the variable transmission according to FIG. 1 relative to the speeds engaged. In the following, using FIGS. 3a to 3h, the force flow or torque curve during the corresponding shifting processes will be described.

Initially, when the vehicle is at rest, the rpm of output shaft 16 is zero. The planet gear carrier 48 coupled with drive shaft 16 likewise does not turn so that ring gear 44, with drive wheel 14 turning in neutral, turns in the opposite direction from the latter.

Figure 3A:
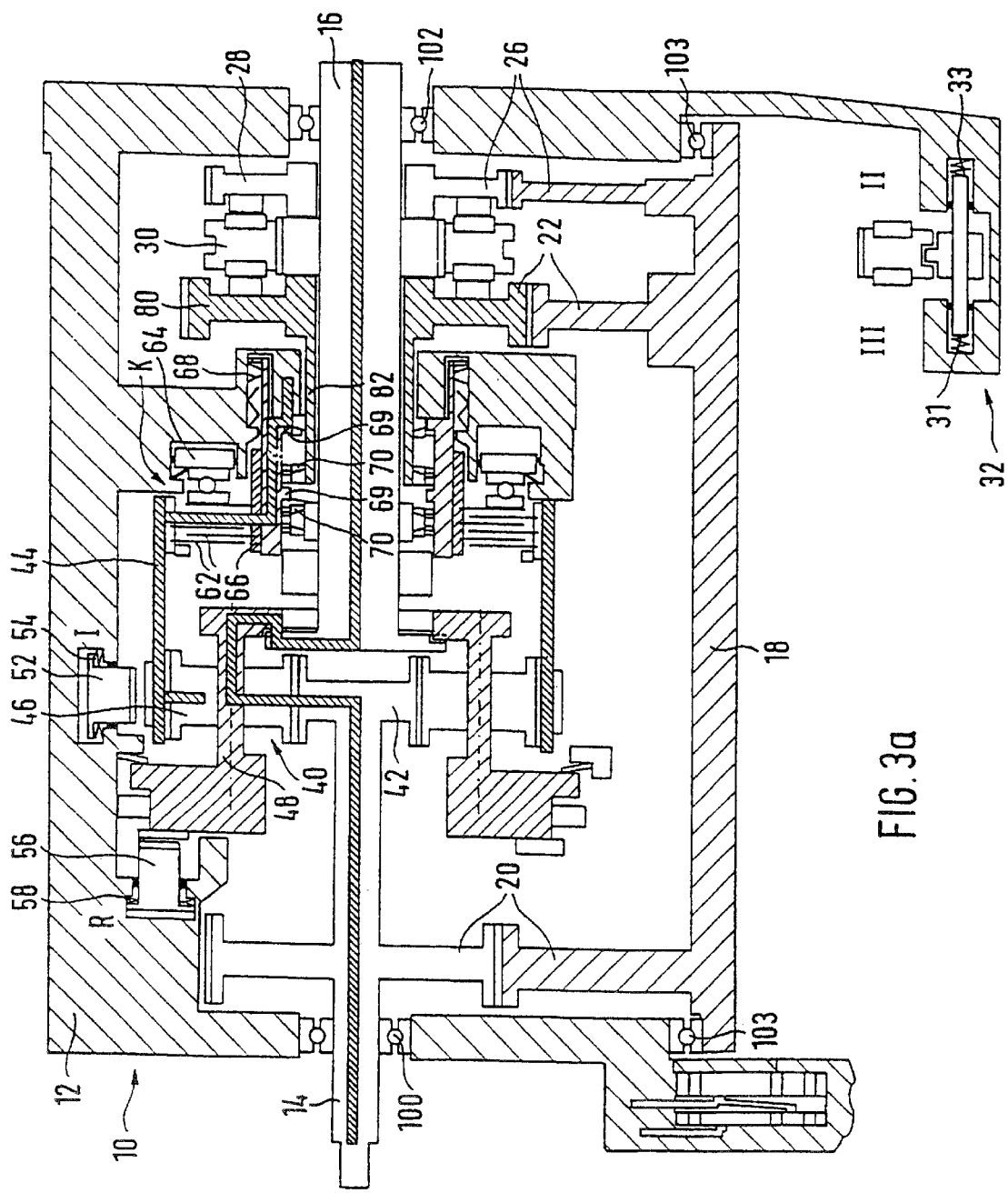

During a starting process, first clutch hub 66 is displaced to the right by operating hub cylinder 68 in the axial direction in FIG. 3a, so that it meshes nonrotatably with transmission housing 12. Then clutch K is operated continuously until it is completely closed. During complete coupling of clutch K, ring gear 44 is secured relative to transmission housing 12. The first locking device 52 can be operated to release clutch K.

Figure 3B:
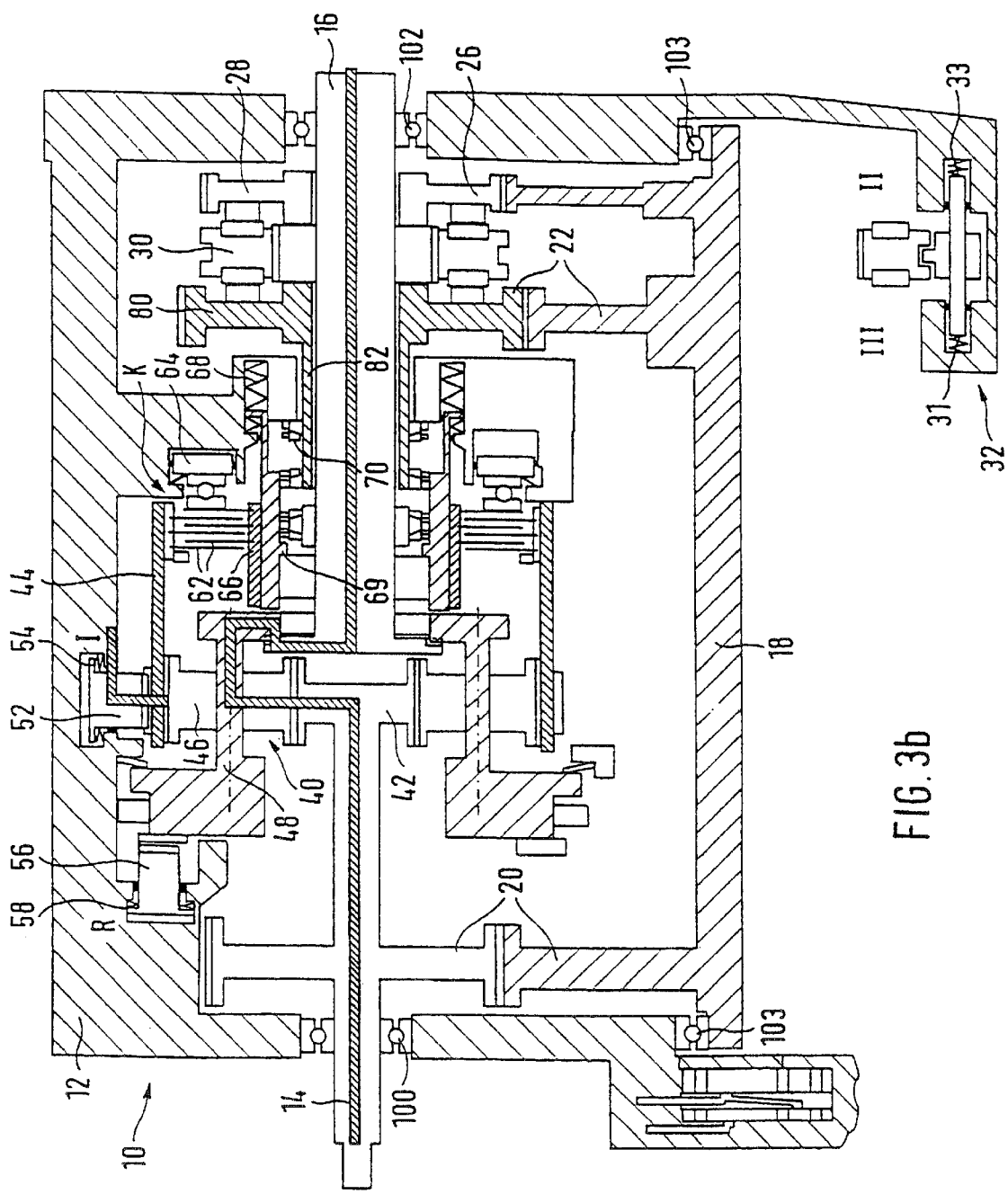
Figure 3C:
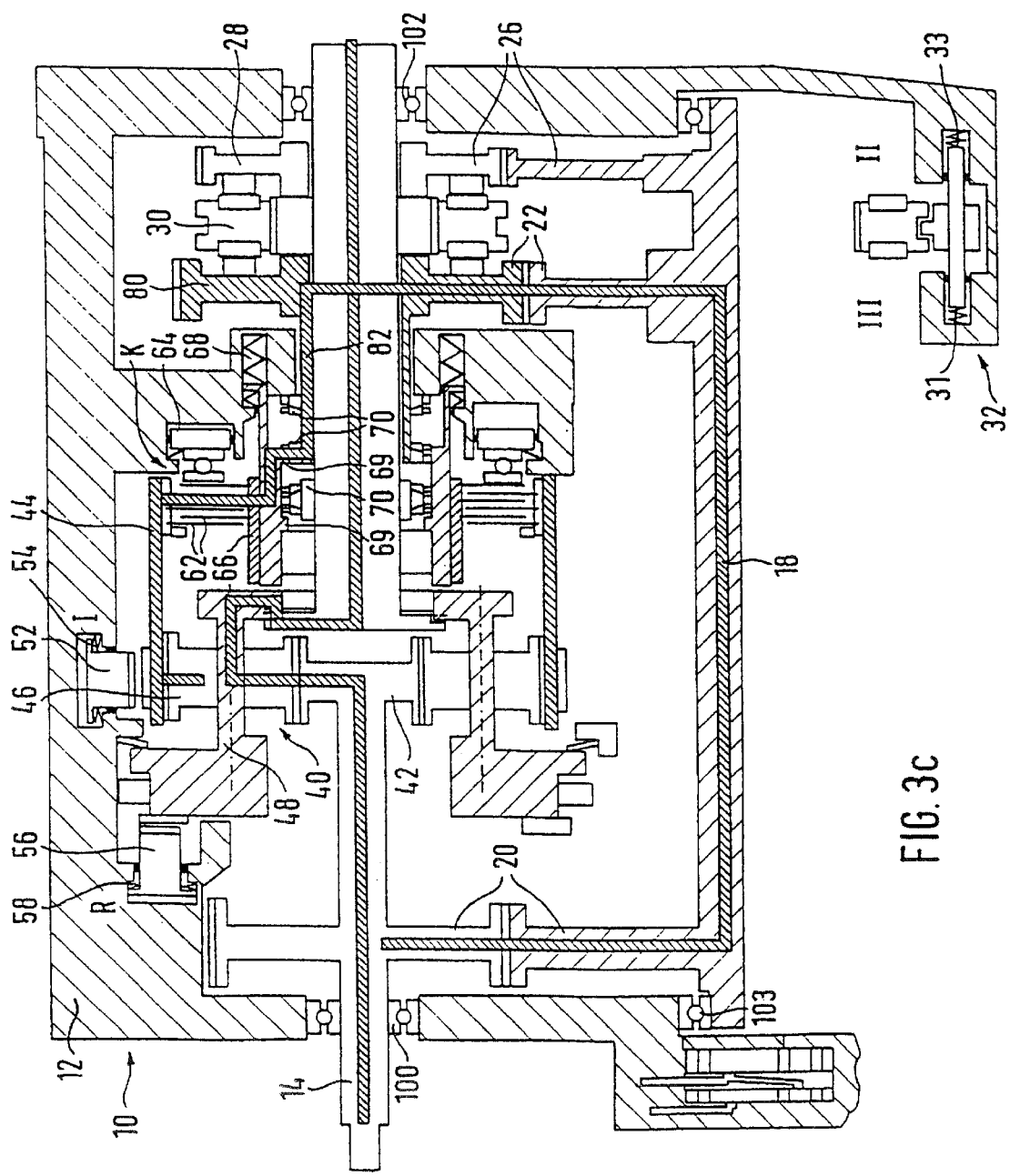

While the cutch is being actuated, a force flow is created as shown in FIG. 3a, from hollow shaft 44 through clutch K and clutch hub 66 to housing 12. As a result, a torque transfer that takes place following clutch actuation is achieved between drive shaft 14 and output shaft 16 through planet gear carrier 48. After the shifting process has ended, in other words when ring gear 44 is secured relative to housing 12 by the first locking device 52, the first gear is engaged, and the clutch is then released again. This state is shown in FIG. 3b in which the thick angular line shows the force flow from the ring gear through the locking device 52 to transmission housing 12.

At the next shift (FIG. 3c), in other words from first gear to second gear, the clutch hub 66 is initially displaced by actuation of hub cylinder 68 in such fashion that it is coupled with gear 80. By operating clutch K, a force flow from ring gear 44 through clutch K and clutch hub 66 to gear 80 can be produced. Since this is connected through the complementary gear of gear pair 22 and hence through countershaft 18 with drive shaft 14, after the first locking device 52 is released and clutch K is operated, the rotational speeds of drive shaft 14 and output shaft 16 or of output shaft 16 and countershaft 18 can be adjusted so that gear 80 or, in a shift from second to third, gear 28 can be coupled in a force-free manner with drive shaft 16 (also decoupled in another shifting process).

Figure 3D:
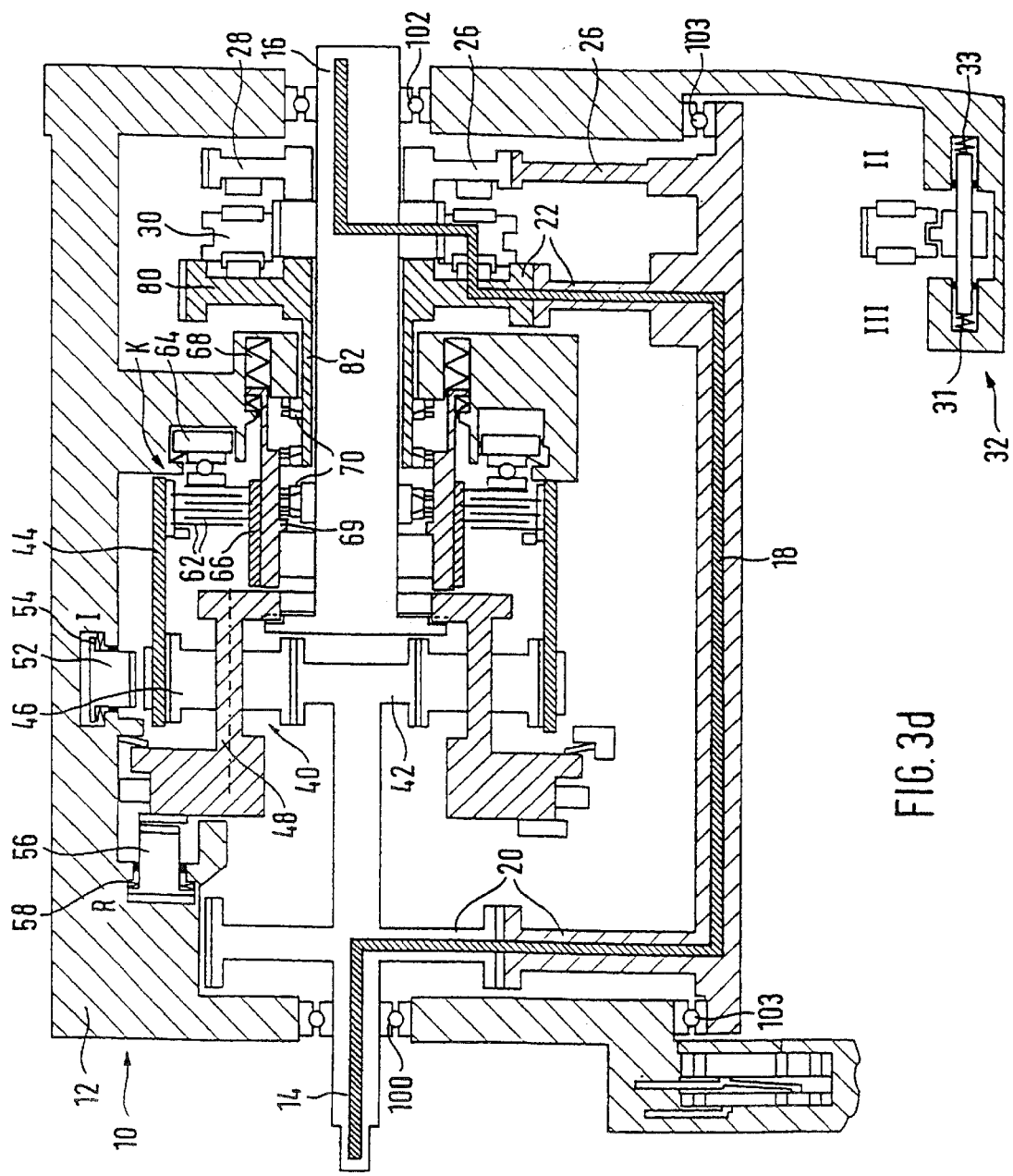
Figure 3E:
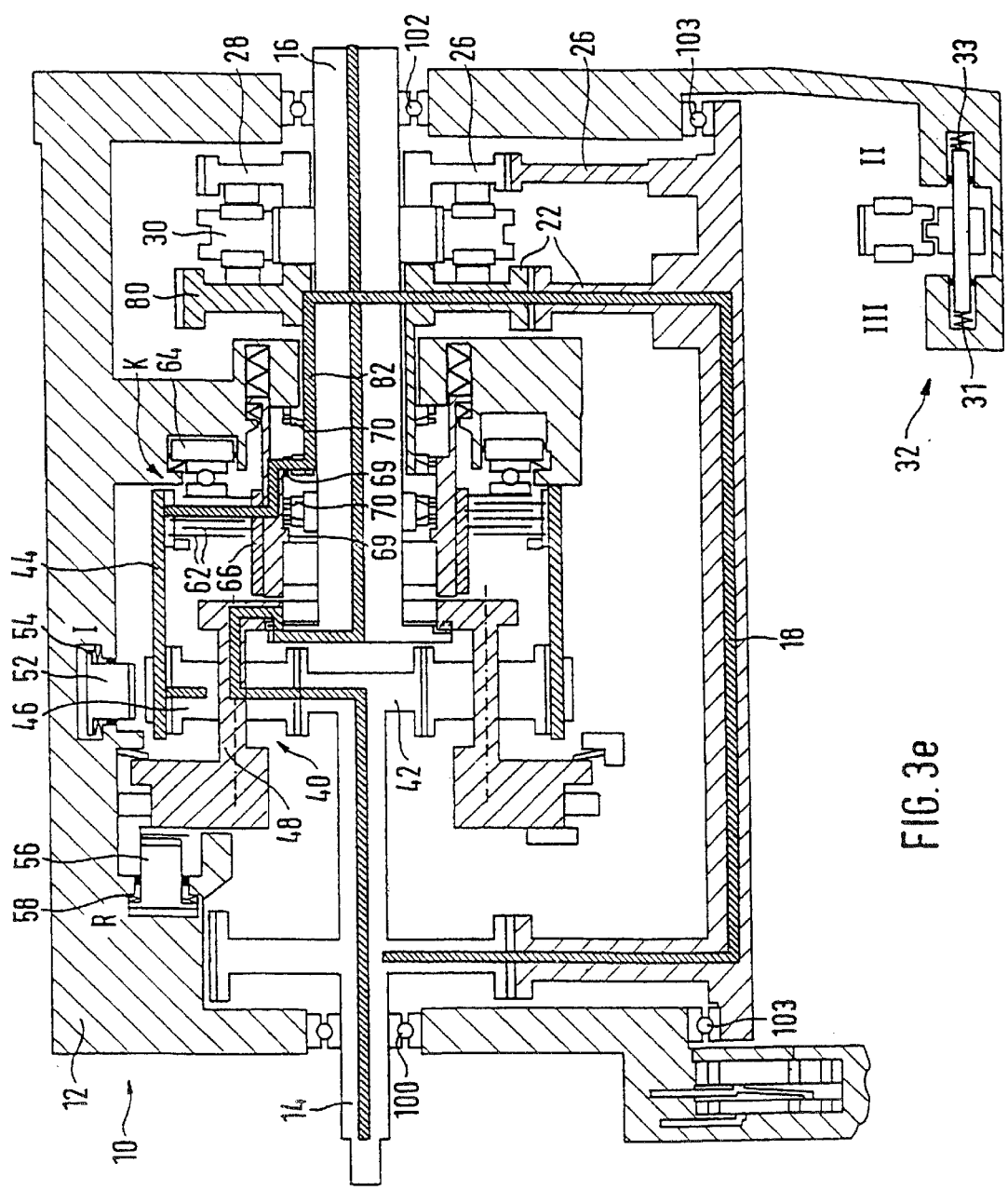

Following the shift, a torque flow is achieved in second gear as shown schematically in FIG. 3d. The clutch is closed again in this state.

As already mentioned previously above, with a transmission ratio change from second to third gear, the procedure is similar (FIG. 3e), with clutch K again being operated for a torque-transferring connection of ring gear 44 and drive shaft 14. With a corresponding clutch actuation or corresponding clutch slip, the rotational speed of countershaft 18 and the rpm of drive shaft 16 can be matched so that first gear 80 and then gear 28 can be shifted with zero force. During the shifts, the selector sleeve 30 is displaced by the shift cylinders 31 and 33 in the axial direction corresponding to second or third gear.

Corresponding to FIG. 3f, when third gear is engaged, the force flow through gear pair 26 is created.

Finally, with an initial axial and zero-force displacement of clutch hub 66, a connection can be created between the clutch and output shaft 16. When the clutch is operated, a nonrotational connection of ring gear 44 and output shaft 16 is produced so that finally, with clutch K completely shifted the ring gear 44 and the planet gear carrier 48 are blocked. Then the planetary transmission 40 rotates at the rpm of drive shaft 14, so that direct drive can be produced.

Figure 3G:
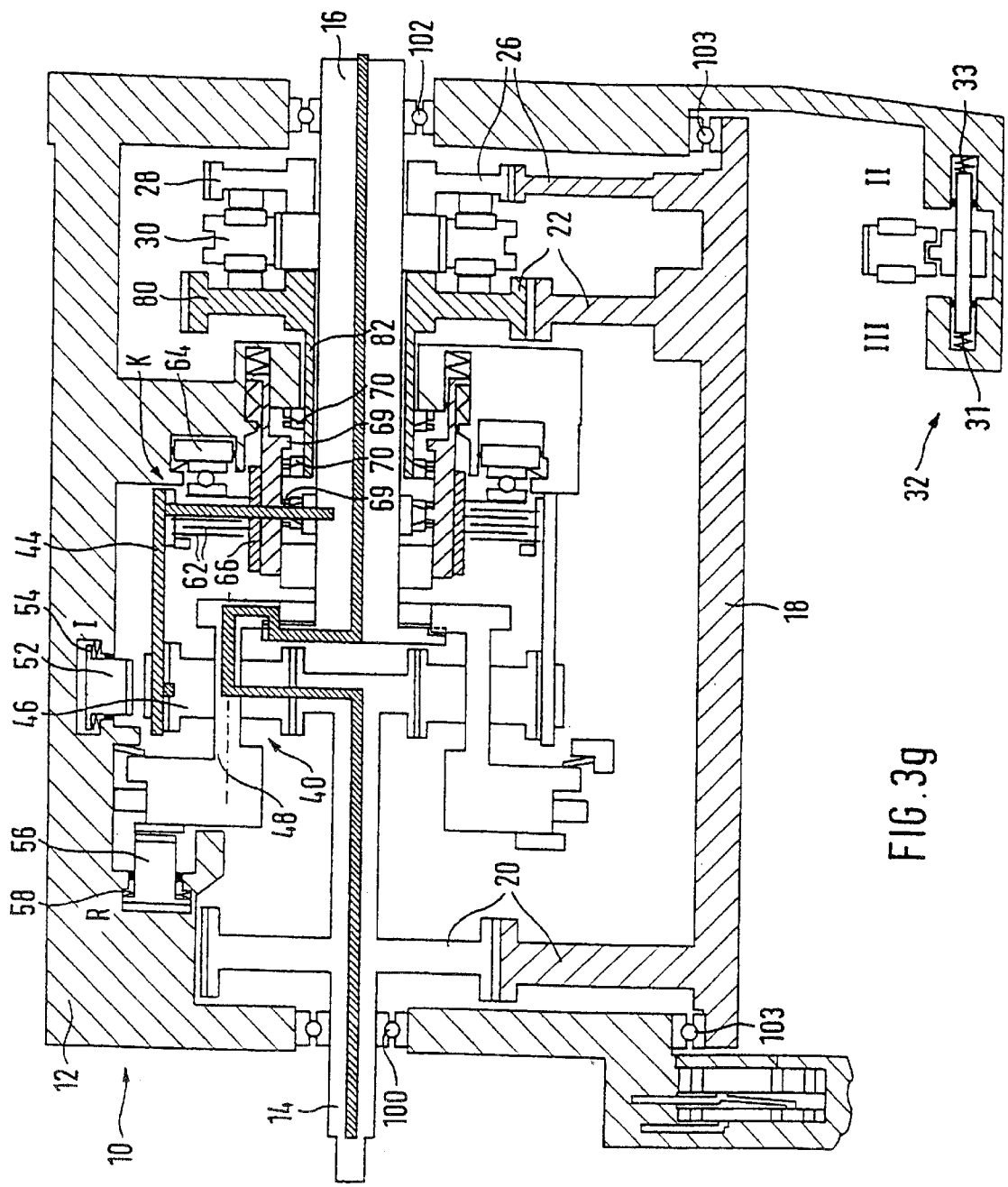
Figure 3H:
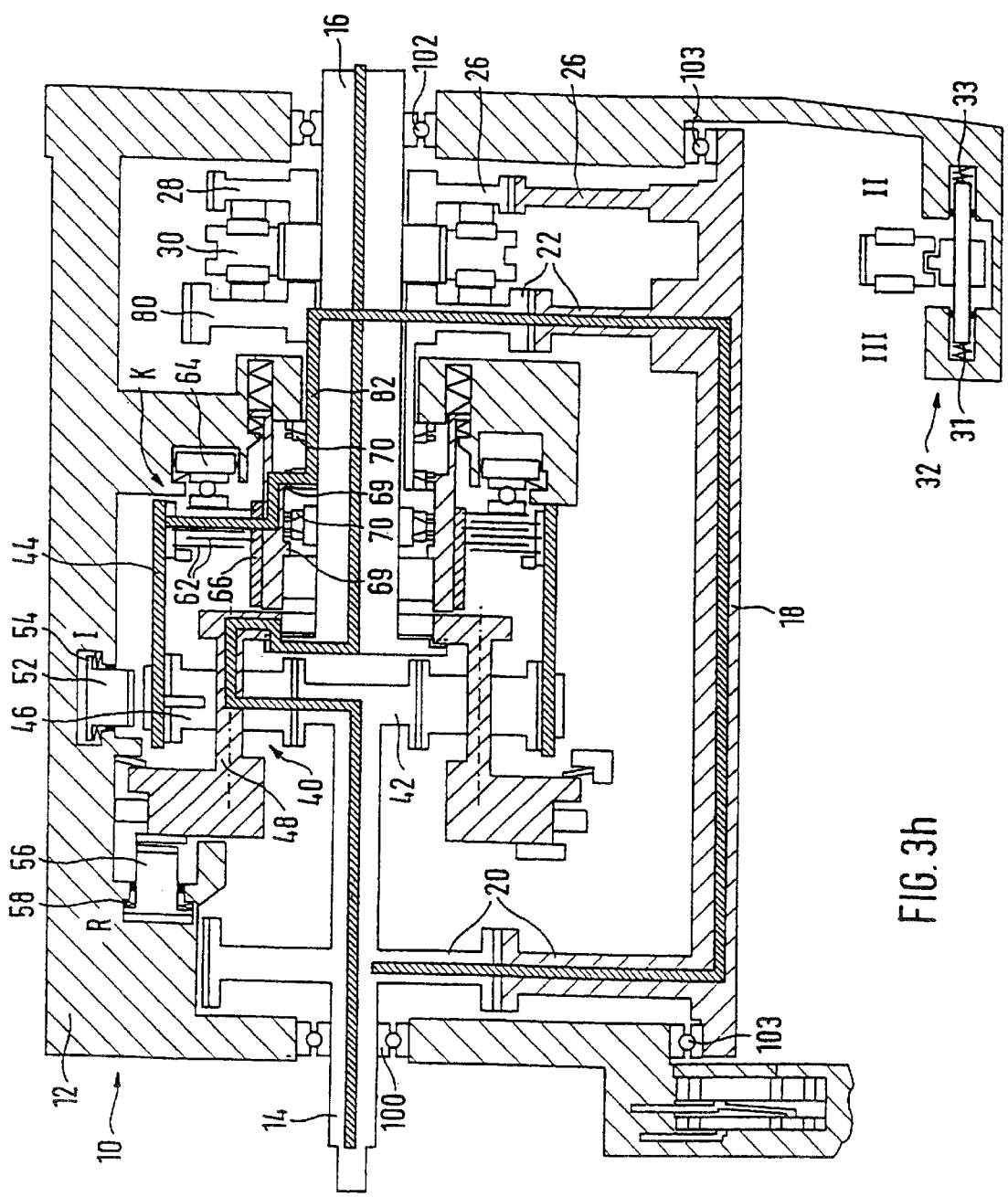

When shifting down from fourth gear to third, third to second, second to first, and then into neutral, the clutch is operated in the reverse manner. Depending on the force and torque flows that are present during these shifts, attention is directed to FIGS. 3g to 3h and the above description of similar FIGS. 3a to 3g. In FIGS. 3g to 3h, FIG. 3g corresponds to a moment flux during a downshift from fourth to third, third to second, and possibly third to first. FIG. 3h represents a moment flow during a downshift from second to first. Other clutch movements during downshifts are also possible.

However, in the variable transmission according to FIG. 2 it is important that as a result of coupling ring gear 44 through coupling K, gear 80, countershaft 18, and gear pair 20 with drive shaft 14, a shift of ring gear 44 and sun wheel 42 can take place so that a match of the rpm and torque can take place between drive shaft 14 and output shaft 16 as well as output shaft 16 and the shiftable gears 28 and 80 mounted thereon.

Figure 4:
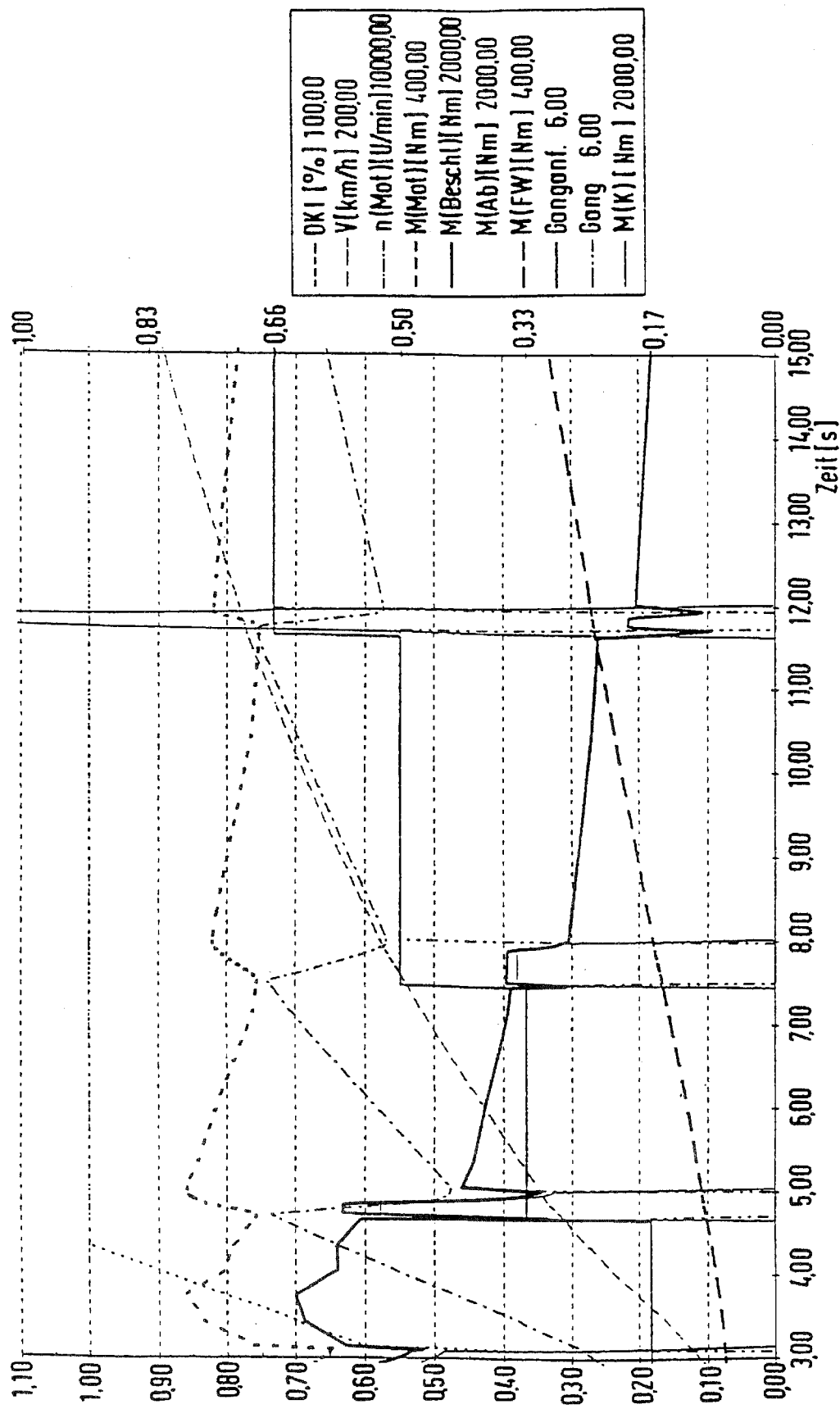
FIG. 4 is a graph including for example rotational and torque curves during continuous acceleration in a variable speed transmission according to the invention.

The advantage of a variable transmission according to the invention can be seen from the illustration in FIG. 4. In this illustration, the following are shown among others: throttle flap position DKI, vehicle speed V, engine rpm n(MOT), engine torque M(MOT), acceleration torque M(acc), speed requirement (speed req), speed engaged as well as clutch torque M(k). The graph shows the individual curves for a continuous vehicle acceleration and the corresponding shifts.

It is readily apparent in FIG. 4 from the solid line M(acc) that even in shifts, in other words in gear changes, the transferred moment never drops to zero but falls only slightly. Thus, with a continuous acceleration process and corresponding shifts, continuous moment transfer from the engine to the drive wheels can take place.

Figure 5:
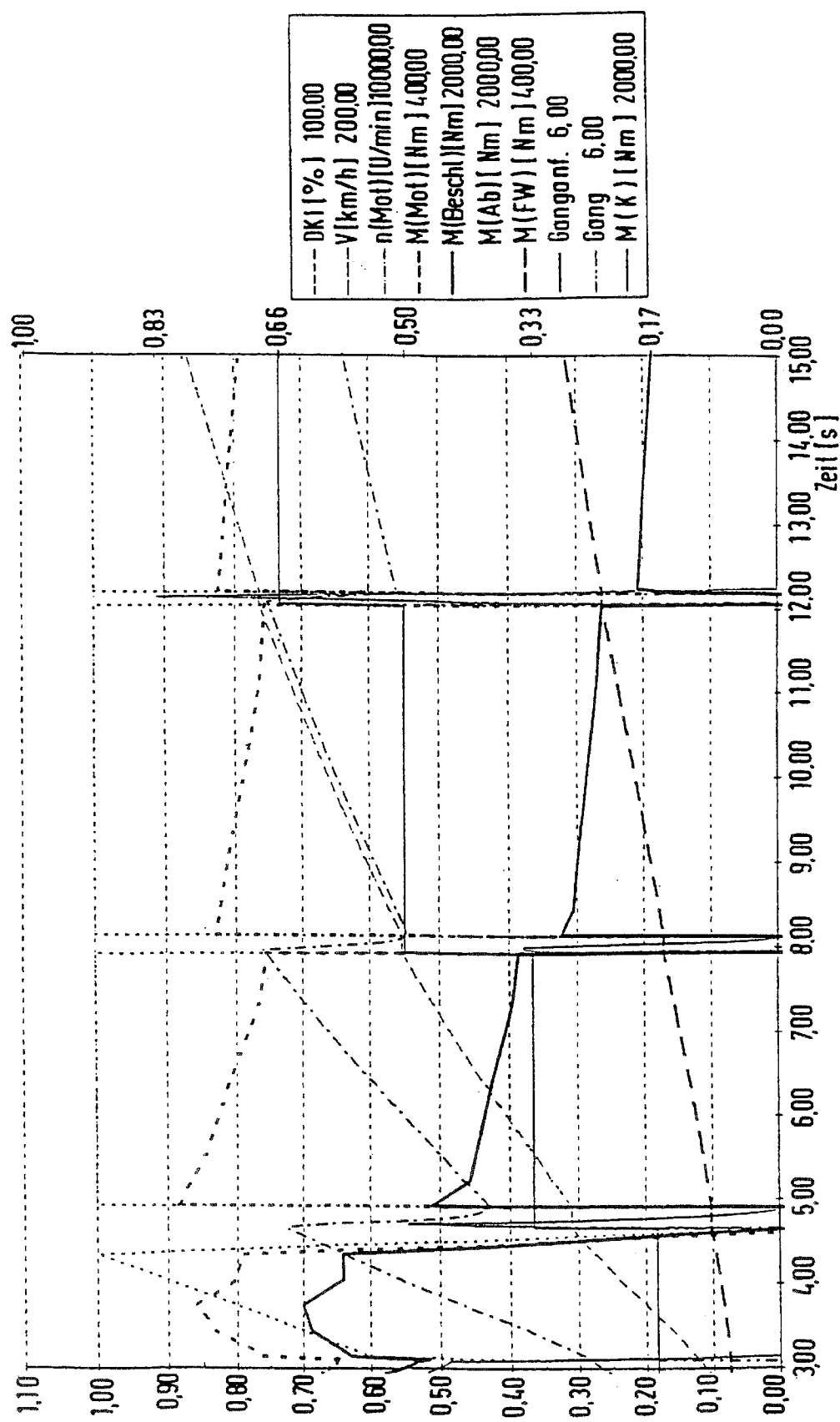
FIG. 5 is a graph like FIG. 4 of a continuous acceleration with a manual gearbox.

In contrast, in FIG. 5 a corresponding curve for a normal manual transmission is plotted. It is readily apparent from the solid line in this curve that in the corresponding gear changes, the acceleration torque drops momentarily to zero. This results in load interruptions that make themselves felt as abrupt movements.

All in all, with the variable transmission according to the present embodiments, an automatic transmission can be produced which has the advantages of a manual transmission, namely high efficiency as well as simple design, as well as completely preventing load interruption when shifting. The variable transmission according to the invention can be manufactured economically and compactly because of its simple design. It requires only a small amount of room for installation in a motor vehicle and the shifting comfort corresponds to that of an automatic transmission.

REFERENCE NUMBERS TABLE

10 Variable transmission
12 Housing
14 Input shaft
16 Output shaft
18 Countershaft
20 Input gear pair
22 Gear pair
24 First loose gear
26 Spur gear pair
28 Second loose gear
30 Claw clutch with selector sleeve
31 Shift cylinder
32 Shifting device for claw clutch
33 Shift cylinder
40 Planetary transmission
42 Sun wheel
44 Ring gear
46 Planet gear
48 Planet gear carrier
52 First locking device
54 First shift cylinder
56 Second locking device
58 Second shift cylinder
K Clutch
62 Clutch plates
64 Clutch cylinder
66 Clutch hub
68 Hub cylinder
69 Hub nose
70 Synchronizing ring
80 First loose gear
82 Hollow shaft
100 First bearing
102 Second bearing
103 Third bearing

What is claimed is:

1. Variable transmission for motor vehicles, comprising an input shaft (14) and a output shaft (16), as well as a first device (18, 20, 22, 26) located between the input shaft (14) and the output shaft (16), delivering torque and permitting variable rpm transmission ratios, said first device in one operating mode ensuring a complete power flow decoupling of the input shaft (14) and the output shaft (16), and a second device (40, 42, 44, 46, 48, K) provided in parallel with the first device for force transmission between the input shaft (14) and output shaft (16) with, which, in contrast to the first device (18, 20, 22, 26), a continuously selectable torque in the range from zero to the maximum applied torque can be transmitted, wherein the second device comprises a planetary transmission (40, 42, 44, 46, 48, K).

2. Variable transmission according to claim 1, wherein the first device (18, 20, 22, 26) is a shifting transmission comprising at least one gear pair, wherein at least one shiftable spur gear of the at least one gear pair is decoupled from an associated shaft (16, 18) or a complementary gear of the at least one gear pair.

3. Variable transmission according to claim 1, wherein the planetary transmission (40, 42, 44, 46, 48) has different gears or transmission stages.

4. Variable transmission according to claim 1, further comprising a shifting device operatively coupled with the variable transmission, the shifting device being operated electromechanically and/or hydraulically or pneumatically.

5. Variable transmission according to claim 1, wherein the second device (40, 42, 44, 46, 48) comprises an effective unit (K) for torque transfer based on friction.

6. Variable transmission according to claim 5, wherein the second device, corresponding to the desired torque transfer between the input shaft and the output shaft (14, 16) respectively, is subjected to control, wherein the control is so designed that the pressure regulation for the effective unit in the form of a clutch is controlled or regulated as a function of at least one of: engine rpm, input rpm, engaged speed, input rpm gradient, and engine rpm gradient.

7. Variable transmission according to claim 5, wherein the effective unit based on friction is a clutch (K).

8. Variable transmission according to claim 7, wherein the clutch (K) is designed as a plate clutch.

9. Variable transmission according to claim 7, wherein the clutch (K) on the one hand engages indirectly or directly the input shaft or the output shaft (14, 16), respectively, or shiftable spur gears (80) mounted thereon and, on the other hand the clutch (K) engages one component of the planetary transmission, wherein a shaft that belongs to this component of the planetary transmission has no direct connection with the input or the output shafts (14, 16) respectively.

10. Variable transmission according to claim 7, wherein the clutch (K) is operable hydraulically or pneumatically.

11. Variable transmission according to claim 10, wherein the clutch (K) is designed as a plate clutch.

12. Variable transmission according to claim 7, wherein the clutch engages a ring gear (44) arranged on a radially side of outward the planetary transmission.

13. Variable transmission according to claim 12, wherein the ring gear (44) can be secured via a locking device (52, 54) to a transmission housing (12).

14. Variable transmission according to claim 12, wherein a planet gear carrier (48) can be decoupled from the input or the output shafts (14, 16).

15. Variable transmission according to claim 14, wherein the decoupling is provided by axial displacement of the planet gear carrier (48).

16. Variable transmission according to claim 7, wherein between the clutch (K) and the input or the output shafts, (14, 16) as well as shiftable spur gears (80) mounted thereon, a shift device (66, 68, 69) is provided that permits a shiftable coupling between a planetary transmission element associated with the clutch (K) and optionally one of: the input or the output shafts (14, 16), the shiftable spur gears (80) mounted thereon, or a transmission housing (12).

17. Variable transmission according to claim 16, wherein the shiftable spur gear (80) that can be connected with the shifting device (66, 68, 69) has a hollow shaft (82) through which the input or the output shafts (14 or 16) respectively extend.

18. Variable transmission according to claim 16, wherein the shifting device (66, 68, 69) includes a coupling hub (66) that can be displaced indirectly or directly on the output shaft (16) in its axial direction whereby, depending on the axial displacement of a clutch hub (66), a connection can be produced between the latter and one of: the output shaft, (16) the shiftable spur gear (80), or the transmission housing (12).

19. Variable transmission according to claim 18, wherein the shiftable spur gear (80) that can be connected with the shifting device (66, 68, 69) has a hollow shaft (82) through which the input or the output shafts (14 or 16) respectively extend.

* * * * *